United States Patent [19]

DiGiulio

[11] 4,409,338
[45] Oct. 11, 1983

[54] PROCESS FOR FORMING FAST-COOL VINYL AROMATIC EXPANDABLE POLYMERS

[75] Inventor: Adolph V. DiGiulio, Wayne, Pa.

[73] Assignee: Atlantic Richfield Company, Los Angeles, Calif.

[21] Appl. No.: 462,156

[22] Filed: Jan. 31, 1983

[51] Int. Cl.³ .............................................. C08J 9/18
[52] U.S. Cl. ...................................... 521/59; 521/56; 521/57; 521/60; 521/139; 521/140; 525/314; 525/901
[58] Field of Search ................... 525/314, 901; 521/56, 521/57, 60, 59, 139, 140

[56] References Cited

U.S. PATENT DOCUMENTS 2,857,339 10/1958 Colwell ................................. 521/59
2,857,340 10/1958 Colwell ................................. 521/59
3,558,534 1/1971 Niechwiadowicz ................... 521/59
3,956,203 5/1976 Burger .................................. 521/59
3,972,843 8/1976 DeJong ................................ 521/59
4,269,871 5/1981 Blommers et al. .................... 521/59
4,304,881 12/1981 Aoki et al. ........................... 525/314

Primary Examiner—Morton Foelak
Attorney, Agent, or Firm—Lewis J. Young

[57] ABSTRACT

Expandable vinyl aromatic polymers are produced, which exhibit fast-cool properties upon formation of foamed articles therefrom, by polymerizing a vinyl aromatic monomer, in which is dissolved 0.5-4.0 percent, based on the monomer, of a triblock copolymer rubber of 2-50 percent of polymerized vinyl aromatic monomer and 50-98 percent conjugated diene, the polymerization forming vinyl aromatic polymer containing the triblock copolymer rubber, and impregnating the polymer so produced, with a blowing agent.

10 Claims, No Drawings

PROCESS FOR FORMING FAST-COOL VINYL AROMATIC EXPANDABLE POLYMERS

Expandable vinyl aromatic polymer particles, such as polystyrene beads, are commercially prepared using aqueous suspension polymerization systems. After formation of the polymer particles, they are normally pre-expanded, such as is described in U.S. Pat. Nos. 3,023,175 and 3,577,360 and the pre-expanded particles are then used in the molding of foamed articles.

After the pre-expanded particles are fed to a mold cavity, which defines the shape of the foamed structure to be produced, the particles are heated above their softening point, such as by steam injected into the mold under pressure, and the particles expand to fill the mold cavity and fuse together to form a foamed article. After the particles have been treated in the mold to produce a foamed article, the article must be cooled for a relatively long time, depending on the size of the article, before it can be removed from the mold in a self-supporting state so as to retain it shape outside the mold. Since such foamed articles have good insulating properties, the cooling time in the mold consumes a significant part of the molding cycle and restricts the number of foamed articles that can be produced from a mold during a given time period.

The cooling time is not appreciably reduced by applying cooling media to the surface of the article or the mold surface since the heat transfer through the foamed article is extremely slow. Such slow heat transfer is evident by the insulative properties of such foamed articles. If such articles are removed from the confines of the mold too soon, the softness of the polystyrene and the pressure due to the hot interior of the article will cause the article to bulge and lose its desired shape.

Processes have been provided to reduce mold cooling time by addition of various compounds to polystyrene beads during polymerization in aqueous suspensions, such as are described in U.S. Pat. Nos. 3,389,097 and 3,503,908, or coating of polystyrene beads with surface active agents, such as is described in U.S. Pat. No. 3,480,570.

I have found that vinyl aromatic polymer particles in which a triblock copolymer rubber has been incorporated by polymerizing solutions of the vinyl aromatic monomer and the triblock copolymer rubber, and which particles have been impregnated with a blowing agent, exhibit fast-cool characteristics in formation of foamed articles therefrom.

BRIEF SUMMARY OF THE INVENTION

Expandable polymer particles, which exhibit fast-cool properties, are produced by adding to an aqueous suspension system, a vinyl aromatic monomer in which is dissolved 0.5–4.0 percent by weight, based on the monomer, of a triblock copolymer rubber of 2–50 weight percent of polymerized vinyl aromatic monomer and 50–98 percent conjugated diene, and effecting polymerization to form vinyl aromatic polymer particles containing said triblock copolymer rubber, and impregnating the polymer particles with a blowing agent to form expandable vinyl aromatic polymer particles containing the triblock copolymer rubber therein.

DESCRIPTION OF THE INVENTION

The present process provides for the production of expandable vinyl aromatic polymers having incorporated therein triblock copolymer rubber and which exhibit fast-cool properties when molded.

Such vinyl aromatic polymers may be produced from various vinyl aromatic monomers such as styrene, alpha-methylstyrene, para-methylstyrene, para-t-butylstyrene, mono-chlorostyrene, dichlorostyrene, or mixtures thereof; as well as copolymerization of such vinyl aromatic monomers with monomers such as divinylbenzene, alkyl and allyl acrylates and methylacrylates, acrylonitrile, maleic anhydride, and the like, wherein the vinyl aromatic monomer is present in at least 50% by weight of the copolymer. The most common and preferred vinyl aromatic monomer is styrene or p-methylstyrene.

In accordance with the present process, the polymerization of the vinyl aromatic monomer is effected in a stable aqueous suspension in the presence of a triblock copolymer rubber so as to incorporate the triblock copolymer rubber in the polymer particles produced. The triblock copolymer rubber is dissolved in the vinyl aromatic monomer and the solution is suspended and polymerization effected under conventional polymerization conditions.

Suspension polymerization techniques are well known. For example, a preferred method employs a suspension system comprised of an inorganic suspending agent, such as tricalcium phosphate and sodium bisulfite modifier. Other preferred suspension systems employ organic suspension stabilizers alone, such as polyvinyl alcohol, hydroxyethyl cellulose, polyvinyl pyrrolidone and the like. Equally useful suspension systems may employ combinations of inorganic and organic suspending agents, for example tricalcium phosphate and polyvinyl alcohol. An important advantage of the aqueous suspension systems is that the desired polymer particles may be obtained as beads of optimum size.

The polymerizations may be effected after immediate suspension of the monomer-triblock copolymer rubber solution, or the monomer-rubber solution may be mass polymerized partially, then suspended and the polymerization completed in aqueous suspension. The polymer products of this invention can, of course, be produced by any of the known techniques, such as mass, suspension, or emulsion polymerization.

As used herein, the term "particles" is meant to cover beads, pellets, coarse grindings, and any other shape having sufficient porosity to allow impregnation without hard cores.

The triblock copolymer rubber is present in an amount of 0.5–4.0 weight percent, based on the weight of the vinyl aromatic monomer and is preferably present in an amount of between 1.0 to 3.0 percent.

The triblock copolymer rubbers are block copolymers of vinyl aromatic monomers and conjugated dienes wherein the blocks of conjugated dienes will have average molecular weights greater than the molecular weight of the combined blocks of vinyl aromatic monomers.

These block copolymers will generally contain 2–50% by weight of polymerized vinyl aromatic monomer and 50–98% by weight of polymerized conjugated diene. More preferably, the vinyl content will be 10–40% with the diene content of 60–90%. The vinyl aromatic monomer may be styrene or alpha-methylstyrene. The conjugated dienes may be butadiene or isoprene.

Triblock copolymer rubbers are linear copolymers of the A-B-A type, wherein, A represents a block of poly (vinyl aromatic monomer) and B represents a block of poly (conjugated diene). Such triblock copolymers can be prepared by sequential addition of the desired monomers into a lithium alkyl initiated polymerization. Another effective method would be to polymerize the diene monomer, for example, in the presence of a difunctional catalyst, such as dilithiostilbene, and then adding the vinyl aryl monomer to form the end blocks. Such triblock copolymer rubbers are also available commercially as, for example, Kraton 1107, a product of Shell Chemical Company being a polystyrene-polyisoprene-polystyrene triblock rubber having 86% by weight polyisoprene and 14% by weight polystyrene.

Also suitable are the hydrogenated triblock copolymer rubbers formed by, for example, selective hydrogenation of A-B-A triblock type copolymers. Especially suitable are the hydrogenated triblock copolymer rubbers wherein the hydrogenation has been primarily in the polydiene blocks, B. Thus U.S. Pat. No. 3,595,942 describes the polymers and suitable methods for their hydrogenation such that at least 80% of the aliphatic unsaturation has been reduced by hydrogenation and less than 25% of the aromatic unsaturation of the vinyl aromatic monomer blocks, A, have been hydrogenated. Such copolymers are available commercially as, for example, Kraton G, a product of Shell Chemical Company, being a polystyrene-polyisoprene-polystyrene triblock rubber wherein the polyisoprene portion has been hydrogenated to a poly(ethylene/propylene) copolymer block.

The process of the present invention may be used with monomer-triblock copolymer rubber solution to water ratios in the suspension which vary from about 0.3 to 1.5 parts by weight monomer solution per 1.0 part by weight water. The free-radical initiating catalysts which are added to the suspension system are the conventional oil-soluble (monomer soluble) catalysts such as organic peroxides, e.g. benzoyl peroxide and t-butyl perbenzoate. Other free-radical producing catalysts that may be used in the invention include azobisisobutyronitrile. Conveniently, conventional amounts of such catalysts are used in the invention.

The time and temperature cycles for the polymerization may be those conventionally employed. Conveniently, the cycle described in Grim, U.S. Pat. No. 2,673,194, or the two-stage temperature cycle described in D'Alelio, U.S. Pat. No. 2,692,260 is employed. With such a two-stage cycle, in the first stage an elevated temperature of about 50°–90° C. is used for a period of about 3–7 hours, and a second stage uses polymerization temperatures in a range of about 100°–150° C. for a period of about 0.25–5.0 hours.

The vinyl aromatic polymer particles, having the triblock copolymer rubber incorporated therein, are rendered expandable by impregnating the particles with between 3–12 percent of a volatile blowing agent such as a gas or an agent which will produce a gas on heating. Such blowing agents are preferably one or more compounds selected from aliphatic hydrocarbons containing from 4 to 6 carbon atoms in the molecule, including butane, pentane, cyclopentane, hexane, cyclohexane, and the halogenated hydrocarbons which boil at a temperature below the softening point of the vinyl aromatic polymer. Such blowing agent, and processes for impregnating the vinyl aromatic polymer particles therewith, are well known, such as for example is described in U.S. Pat. No. 2,983,692. It is well known to those skilled in the art, that the blowing agent, or mixture of blowing agents, may be incorporated into the polymer particles during the aqueous suspension polymerization of monomer solutions.

The modified vinyl aromatic polymer particles, containing a volatile blowing agent, generally in an amount of about 3–12 percent, are pre-expanded by exposing the particles to heat, such as by subjecting them to steam, hot air or hot water, for example by use of a pre-expander as described in U.S. Pat. No. 3,023,175, as is commercially done. The pre-expanded particles are then permitted to stand under atmospheric conditions for a period of time, such as two hours to two days prior to charging the pre-expanded, aged particles to a mold for the formation of foamed articles.

It will be obvious to those skilled in the art that the present process may also be used for vinyl aromatic polymer particles that contain various other additives, such as flame retardant agents, dyes, pigments, antistatic agents, plasticizers, and the like.

The invention is further illustrated by the following examples wherein parts and percentages are by weight unless otherwise indicated.

EXAMPLE I

To a series of 12 oz. crown cap bottles there was charged 100 g water, 0.0003 g sodium bisulfite, 0.3 to 1.0 g tricalcium phosphate (TCP), 0.03 g benzoyl peroxide, 0.5 g t-butyl-perbenzoate, and 100 g of a styrene-triblock copolymer rubber solution containing the amount of triblock copolymer rubber listed in Table I, which was a 15/85 styrene/isoprene ABA triblock rubber (Kraton 1107, sold by Shell Chemical Company). The bottles were capped and suspension polymerization effected by end-over-end agitation of the bottles in a heated oil bath at 90° C. for a 6 hour period, followed by a 4 hour period at 120° C., and cooling to 25° C. over a period of 2 hours. The contents of the bottles were emptied and acidified to pH of 1.0 with hydrochloric acid and the removed polymer beads washed with water. The recovered beads were separated by sieving with different mesh sieves (U.S. Standard Sieve). A −25+40 bead size denotes beads which passed through a 25 mesh sieve and were retained on a 40 mesh sieve. Similarly, a −16+25 beads size denotes the beads which passed through a 16 mesh sieve and were retained on a 25 mesh sieve.

Portions of the beads were impregnated with n-pentane by charging to 12 oz. bottles, 100 g water containing the type and amount of surfactant listed in Table I, and 0.5–1.0 g tricalcium phosphate, 100 g beads and 8.1 g n-pentane. The bottles were capped and heated at 112° C. for 2 hours with end-over-end agitation. After cooling to room temperature the contents were acidified to a pH of about 1.0, centrifuged, filtered and washed with water, then tray dried at room temperature.

Beads were next pre-expanded in a loosely-capped unstirred five gallon batch expander by heating for two minutes in steam delivered from a 0.25 inch line at a pressure of 12 psig to give densities of approximately 1.0 pound per cubic foot (pcf), while higher densities were attained by bleeding air into the steam line to reducehe steam temperature when conducting the pre-expansion or by shortening the time of contact. After aging overnight, the beads were molded into cylindrical moldings 2 inches in thickness and 8 inches in diameter. Cool times were determined and the molded specimens examined for appearance, dimensional stability and degree of fusion.

The results are listed in Table I:

TABLE I

| Run No. | Triblock Copolymer Rubber (%) | Bead Size | Surfactant for Impregnation (g) | Density of Pre-puff (pcf) | Cool Time (sec) |
|---|---|---|---|---|---|
| 1 | 0 | −25 + 40 | 0.15 (a) | 1.53 | 105 |
| 2 | 0 | −25 + 40 | 0.16 (b) | 1.67 | 103 |
| 3 | 1 | −25 + 40 | 0.15 (a) | 1.82 | 19 |
| 4 | 1 | −25 + 40 | 0.16 (b) | 1.84 | 66 |
| 5 | 2 | −25 + 40 | 0.15 (a) | 1.64 | 68 |
| 6 | 2 | −25 + 40 | 0.16 (b) | 1.66 | 63 |
| 7 | 2 | −16 + 25 | 0.16 (b) | 1.50 | 120 |
| 8 | 3 | −16 + 25 | 0.16 (b) | 1.50 | 120 |
| 9 | 0 | −16 + 25 | 0.16 (b) | 1.64 | 148 |
| 10 | 0 | −16 + 25 | 0.16 (b) | 1.08 | 81 |
| 11 | 3 | −16 + 25 | 0.16 (b) | 1.10 | 56 |

(a) an alkylaryl polyether of octylphenol containing 9–10 ethylene oxides units (Triton X-100; Rohm & Haas Co.)
(b) an alkylaryl polyether of octylphenol containing 16 ethylene oxide units (Triton X-165; Rohm & Haas Co.)

EXAMPLE II

The procedure of Example I was followed using, as the block copolymer rubber, a hydrogenated 15/85, styrene/isoprene ABA tri-block rubber (Kraton G: a product of Shell Chemical Company), in the amounts listed in Table II. The results were as follows:

TABLE II

| Run No. | Hydrogenated Triblock Copolymer (%) | Bead Size | Surfactant for Impregnation (g) | Density of Pre-Expanded (pcf) | Cool Time (sec) |
|---|---|---|---|---|---|
| 1 | 0 | −16 + 25 | 0.16 (a) | 1.64 | 148 |
| 2 | 0 | −16 + 25 | 0.16 (a) | 1.08 | 81 |
| 3 | 1 | −16 + 25 | 0.16 (b) | 1.32 | 92 |
| 4 | 1 | −16 + 25 | 0.15 (a) | 1.40 | 115 |
| 5 | 1 | −25 + 40 | 0.16 (b) | 1.56 | 68 |
| 6 | 1 | −25 + 40 | 0.15 (a) | 1.48 | 72 |
| 7 | 2 | −25 + 40 | 0.16 (b) | 1.70 | 21 |
| 8 | 2 | −25 + 40 | 0.15 (a) | 1.66 | 46 |
| 9 | 3 | −25 + 40 | 0.16 (b) | 1.74 | 16 |

(a) See Table I.
(b) See Table I.

What is claimed is:

1. A process for producing expandable vinyl aromatic polymer particles which exhibit fast-cooling properties in molded products produced therefrom comprising:
polymerizing a vinyl aromatic monomer in which is dissolved about 0.5 to 4.0 percent by weight, based on the vinyl aromatic monomer, of a triblock copolymer rubber of 2–50 weight percent of polymerized vinyl aromatic monomer and 50–98 weight percent of polymerized conjugated diene, to form vinyl aromatic polymer particles containing said triblock copolymer rubber; and impregnating the vinyl aromatic polymer particles, containing said triblock copolymer rubber, with a blowing agent.

2. The process as defined in claim 1 wherein said triblock copolymer rubber is present in an amount of 1.0 to 3.0 percent.

3. The process as defined in claim 1 wherein said triblock copolymer rubber is formed from a vinyl aromatic monomer selected from the group comprising styrene and alpha-methylstyrene, and from a conjugated diene selected from the group comprising butadiene and isoprene.

4. The process of claim 1 wherein said conjugated diene of said triblock copolymer rubber is hydrogenated.

5. The process as defined in claim 1 wherein said triblock copolymer rubber is comprised of polystyrene and polybutadiene.

6. The process as defined in claim 1 wherein said vinyl aromatic monomer, which is polymerized in the presence of the triblock copolymer rubber, is styrene or p-methylstyrene.

7. The process of claim 1 wherein said vinyl aromatic monomer copolymer rubber solution is polymerized in a stable aqueous suspension.

8. The process as defined in claim 1 wherein said blowing agent is selected from the group consisting of aliphatic hydrocarbons having 4 to 6 carbon atoms, halogenated hydrocarbons which boil at a temperature below the softening point of the vinyl aromatic polymer, and mixtures thereof.

9. A process for producing expandable polystyrene particles which exhibit fast-cooling properties in molded products produced therefrom comprising:
polymerizing styrene, in which is dissolved about 0.5 to 4.0 percent by weight, based on the styrene monomer, of a triblock copolymer rubber of 2–50 weight percent of polystyrene and 50–98 weight percent polybutadiene, to form polystyrene particles containing said triblock copolymer rubber; and impregnating the polystyrene particles, containing said triblock copolymer rubber, with a blowing agent.

10. The process as defined in claim 9 wherein said triblock copolymer rubber is present in an amount of 1.0–3.0 percent.

* * * * *